324-77.
08-08-72 XR 3,683,164 SR

United States Patent [15] 3,683,164

Minami [45] Aug. 8, 1972

[54] ANALOG CALCULATION APPARATUS FOR PERFORMING CONVOLUTION

[72] Inventor: Shigeo Minami, Ashiya-shi, Japan

[73] Assignee: Hitachi, Ltd., Tokyo, Japan

[22] Filed: April 16, 1969

[21] Appl. No.: 816,549

[30] Foreign Application Priority Data

April 27, 1968 Japan ....................43/28505

[52] U.S. Cl....235/181, 179/100.2 MD, 235/150.53, 235/183, 324/77 G

[51] Int. Cl. ..........................................G06g 7/19

[58] Field of Search...........235/181, 194, 183, 150.4; 340/173; 333/28

[56] References Cited

UNITED STATES PATENTS

| | | | |
|---|---|---|---|
| 3,100,297 | 8/1963 | Reines | 235/181 X |
| 3,240,919 | 3/1966 | Schultz | 235/181 X |
| 3,310,665 | 3/1967 | Schimmel | 235/181 |
| 3,418,625 | 12/1968 | Anstey | 235/181 X |
| 3,435,195 | 3/1969 | Loper | 235/181 |
| 3,459,928 | 8/1969 | Lerwill et al | 235/181 |
| 2,794,965 | 6/1957 | Yost | 235/181 |
| 3,303,335 | 2/1967 | Pryor | 235/181 |
| 2,836,359 | 5/1958 | Mazzagatti | 235/183 |
| 2,922,965 | 1/1960 | Harrison | 333/28 |
| 3,489,848 | 1/1970 | Perreault | 333/28 X |

*Primary Examiner*—Felix D. Gruber
*Attorney*—Craig, Antonelli & Hill

[57] ABSTRACT

An analog calculating apparatus in which an analog signal, which is a function of time and has been ( permanently ) recorded on a first channel track of a tape recorder is read out during a first run of the tape of the tape recorder and is multiplied by a first one of a set of coefficients at equal time intervals in a coefficient multiplier and recorded on a second channel track of the tape recorder. During the second run of the tape the analog signal read out from the first track is then multiplied by the second coefficient in the coefficient multiplier and added through an adder to the product read out from the second track, and the sum is then recorded on the second track immediately after the second track is erased, and this latter operation is then repeated.

5 Claims, 3 Drawing Figures

INVENTOR

SHIGEO MINAMI

BY

Craig, Antonelli, Stewart & Hill ATTORNEYS

INVENTOR

SHIGEO MINAMI

BY

Craig, Antonelli, Stewart & Hill ATTORNEYS

INVENTOR
SHIGEO MINAMI

BY
Craig, Antonelli, Stewart & Hill ATTORNEYS

ANALOG CALCULATION APPARATUS FOR PERFORMING CONVOLUTION

The present invention relates to an analog calculating apparatus for performing a convolution between two functions.

Generally, a convolution between two functions often appears in practical problems. For example, a response of a linear system is represented by the equation $$O(\tau)=\int_{-\infty}^{\infty} W(t)I(\tau-t)dt \qquad (1)$$

where $O(\tau)$ is an output, $W(t)$ is an impulse response, and $I(t)$ is an input.

In any arrangement, when the system is regarded as a linear system, there is the relation of Equation (1) between an input and an output. The function $W(t)$ at this time is called an apparatus function or instrumental function. Although the form of the output is different from that of the input because of the deformation due to the apparatus function, the form of the true input may be deduced from the given output and apparatus function.

Practically, there are many cases where the calculation of Equation (1) is necessary. In such cases the calculation has usually been carried out by means of a digital computer after the input $I(t)$ undergoes an A-D conversion. However, such a method requires a considerable time and is troublesome to calculate even with a high speed computer.

Now, a conventional method of calculating Equation (1) will be described. The numerical calculation (1) Equation (1at a point $m\Delta t$ on the time axis is carried out on the basis of the equation $$O(m\Delta t)=\sum_{n=-L}^{U} W(n\Delta t)I(m\Delta t-n\Delta t) \qquad (2)$$

where $m$ and $n$ are integers, and $n$ takes a value from $-L$ to U including O, $-L$ being lower than $m\Delta t$ and U being higher than $m\Delta t$. Therefore, $O(t)$ is represented by a set of sample values of such kind. Here, L is a lower limit and U is an upper limit.

The composite value $O^*(t)$ of samples of $O(t)$ is represented in terms of δ-function by $$O^*(t)=\sum_{m=-\infty}^{\infty} O(m\Delta t)\delta(t-m\Delta t)$$

$$=\sum_{m=-\infty}^{\infty}\sum_{n=-L}^{U} W(n\Delta t)I(m\Delta t-n\Delta t)\delta(t-m\Delta t) \qquad (3)$$

According to the conventional method of calculation, as is evident from the above equations, Equation (3) is calculated by first calculating Equation (2) successively with respect to all points of n for each point of m, and then varying m from $-\infty$ to $\infty$ stepwise.

An example of the arrangement for performing the conventional method is an analog correlator employing a tape recorder. The operation of the correlator is as follows: Two functions to be correlated recorded on two tracks of a tape are respectively read out as two signals by two heads one of which is fixed and the other of which is shifted relative to the one (actually, the two heads may be fixed with a certain space therebetween and the length of the tape interposed therebetween may be varied), and one signal is multiplied by the other delayed signal and the product integrated. At each scan (throughout the specification, the term scan refers to one run or transportation of the tape) the delay time of the delayed signal is varied, and the result of the integration is plotted as a function of delayed time. In this operation, one scan calculates Equation (3) for $n, m$ being fixed at a certain value. The variation in the delay time between the two signals at each scan corresponds to the variation in $m$.

An example to which the convolution is applied is the calculation of a weighted average of a signal in the presence of noise. When an electrical filter for removing the noise is considered, the impulse response $W(t)$ of the filter is considered to correspond to a weight at the time of performing a moving average of an input $I(t)$. Since a weight of a passive type filter usually exists in the region of positive time only, the output from the filter is delayed relative to the input and includes unsymmetrical distortion. However, if the input is once stored in some storing medium, a method by which future data after the time of treatment of the input signal can be known is applicable. Therefore, it operates on the input in the same manner as that employing a filter the impulse response of which exists also in the region of negative time, and it is possible to provide, for example, a symmetrical function as the weight function.

Such a filter is called a mathematical filter and effects a moving average by employing future, present, and past data, that is, decreases the variation component of the data by utilizing the idea similar to interpolation to smooth the data.

There are many examples in which a moving average of a signal including noise therein can be calculated by utilizing the convolution, for example cases where the input is directly a function of time or cases where the input is a quantity other than time. Examples of the former are the response of electrical circuitry, the response of a living body to a stimulus, etc. Examples of the latter cases where the input is a function of a physical quantity other than time, for example, position, wavelength of an electromagnetic wave, the intensity of a magnetic field, etc. are gas chromatographs, X-ray microanalyzers, nuclear magnetic resonance apparatuses, mass spectrometers, electron spin resonance apparatuses, spectrophotometers, ultraviolet, visible, and infrared spectrometers, etc. In the latter cases, the read out of an optical or electronic image distributed in space, for example, can be treated as a signal which is a function of time by the scanning type measuring method employed for so-called auto-recording analyzing instruments.

Even when the signal itself cannot be discriminated by the presence of large noise, if the number of times of multiplication by convolution is N by repeatedly utilizing a measured data and if the weight is uniform, the signal to noise ratio is improved proportionally to N and the signal component is discriminated from the noise component by degrees though this situation does not always stand.

An object of the present invention is to provide a small sized, simple and inexpensive analog operation apparatus capable of performing the convolution between two functions.

According to the present invention there is provided an analog calculation apparatus comprising means for storing an analog data I($t$) in a variable of time $t$, storage means capable of dividing a signal W($t$) in a variable of time $t$ into n points with equal time intervals $\Delta t$, means for multiplying any value W($n\Delta t$) obtained by dividing said signal W($t$) into n points by any value I($m\Delta t - n\Delta t$) obtained by dividing said analog data I($t$) into n points with equal time intervals over one scanning range of $m$, $m$ being varied successively, and $n$ being shifted by $\Delta t$ at each scanning, and means for successively storing the sum of calculated values at said each scanning.

Other objects and features of the present invention will become apparent from the following detailed description of the invention with reference to the accompanying drawings, in which.

As stated above, a conventional method of calculating Equation (1) by means of a conventional operation apparatus has been such that Equation (2) is successively calculated with respect to all the points of $n$ for each value of $m$, and then Equation (3) is calculated by varying $m$ from $\infty$ to $-\infty$.

In contrast, according to the present invention Equation (3) is calculated by first varying $m$ from $\infty$ to $-\infty$ for each point of $n$, and then taking summation with respect to $n$. In more detail, W($t$) is divided at $n$ points into equal time intervals of $\Delta t$. During one scanning $m$ is successively changed while multiplying a signal I($m\Delta t - n\Delta t$) by W($n\Delta t$) which is the value of W($t$) at a certain point, the result of which is stored on a tape, for example. The point $n$ is shifted from $-$L to U each time of scanning, and then the sum of the above results is taken. That is, in performing the analog calculation of Equation (3), the apparatus of the invention carries out the calculation of $$\sum_{m=-\infty}^{\infty}$$

at each point of $n$ and then carries out accumulation with respect to $n$, while according to the conventional method the calculation of $$\sum_{n=-L}^{U}$$

is performed at each point of $m$.

Figure 1:
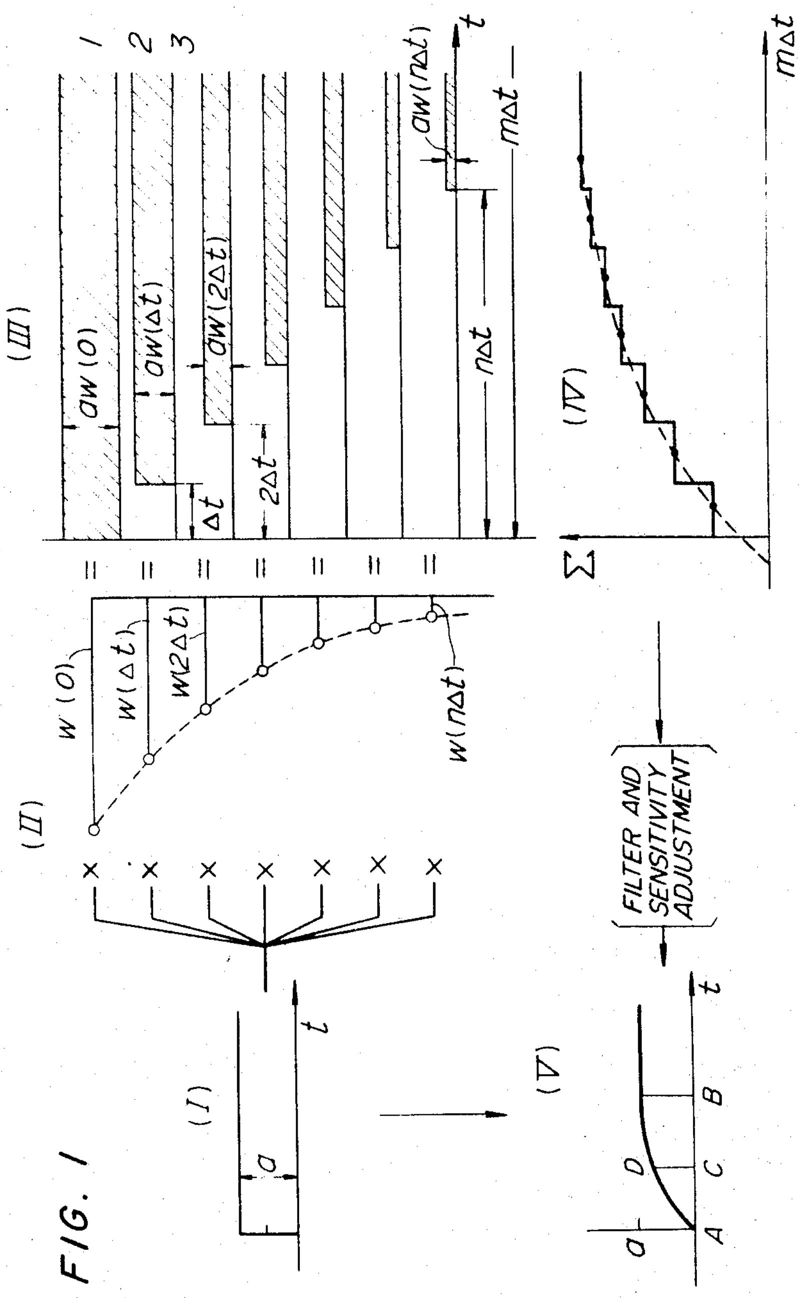
FIG. 1 is a diagram for explaining the principle of operation of an analog operation apparatus to which the present invention is applied.

The principle of the calculating method employed by the calculation apparatus of the invention is shown in FIG. 1. For the sake of simplicity of description, the form of an exponential function is selected for the weight, and the step function is employed as the input. The calculation apparatus of the invention calculates Equation (1) in the form of Equation (3). Therefore, the output in this case must show the step response of a system having the above-mentioned weight function, i.e., a first order delay element.

A step function (I) having a height $a$ is recorded on a first track of a two track tape, and employed a number of times without erasure throughout the calculation. In the first scanning or pass of the tape past the heads, the function (I) read from the first track is multiplied by W($o$) and recorded on a second track at once. This is 1 of (III). In the second scanning, the signal of the first track is used again and multiplied by W($\Delta t$) to become 2 of (III). This signal is delayed by $\Delta$t and added to the signal 1 of (III) read from the second track was recorded in the first scanning to be recorded on the second tract immediately after the erasure of the signal 1 of (III). These operations are successively repeated, and after $n+1$ scans the amplitude at $m\Delta t = n\Delta t$ of the signal to be recorded on the second track is, setting W($t$)$=e^{-t}$, $$O(m\Delta t) = O(n\Delta t) = aW(o) + aW(\Delta t) + \ldots\ldots + aW(n\Delta t)$$

$$= a(1 + e^{-\Delta t} + e^{-2\Delta t} + \ldots\ldots + e^{-n\Delta t})$$

$$= ka \;\; 1 - e^{-(n+1)\Delta t} \qquad (4)$$

where $k = 1/1 - e^{-t}$ By passing a signal representative of Equation (4) through a filter and a sensitivity adjusting part, the step response $$O(t) = a(1 - e^{-t}) \qquad (5)$$

can be obtained.

The present invention is intended to apply the above mentioned calculating method to electronic, mechanical, and all other apparatus to which the calculating method is applicable.

The present invention includes the application to analog calculation apparatus for calculating the output of a system or convolution $$O(\tau) = \int_{-\infty}^{\infty} W(t) I(t - \tau) d\tau$$

wherein W($t$) corresponds to the impulse response of the system, and I($t$) corresponds to the input, and to analog calculation apparatus for calculating the weighted moving average of a signal including noise wherein I($t$) corresponds to the input signal including noise, and W($t$) corresponds to a weight when moving average of the input I($t$) is performed, for example analog calculation apparatus for optimizing the calculation by a symmetrical weight function generator by using the symmetrical weight function as W($t$).

A two-channel analog tape recorder to which the present invention is applied will next be described. An input signal I($t$) to be treated is fed from a signal source 18 to a recording amplifier 10 to be amplified, and then recorded by a recording head 6 on a first track 16. This signal is not erased but fixed on the tape until the entire calculation is completed. Therefore, an erasing head 5 of a first channel is maintained in the non-operating state during the calculation.

In an ordinary tape recorder the arrangement of heads is opposite to that of the present invention, that is, they are arranged in the order of recording, erasing and reproducing heads in the direction of tape feed. The tape recorder employed in the present invention is a conventional instrumentation tape recorder available commercially, examples of which are the Sony, Type-FMR 44 tape recorder and the Teac, Type R-351 F tape recorder.

The initiation of the calculation begins with a first scan by reading out of this signal recorded on the tape, which has been rewound by a conventional mechanism, not shown, by a reproducing head 4 of the first channel. The tape is rewound during each scan. The signal read out by the head 4 is supplied through a reproduction amplifier 1 and a line 19 to a coefficient multiplier and phase inverter 11 the construction of which is familiar to one skilled in the art, as disclosed in FIG. 1.5 (*d*) on Page 13 of G. A. Korn and T. M. Korn, "Electronic Analog Computers", 1956, McGraw and Hill Book Company, Inc., New York where the signal is multiplied by a coefficient $W(o)$ which is the first predetermined value of the weight function $W(t)$ and at the same time its sign is determined and, after having passed through an adder 12 and a second channel recording amplifier 13, is recorded by a second channel recording head 9 on a second track 17. This signal corresponds to the signal 1 of (III) in FIG. 1.

Here, the important thing is that since there is a positional difference *d* in the moving direction of the tape indicated by the arrow between the reproducing head 4 of the first channel and the recording head 9 of the second channel, there is a time difference $d/v = \Delta t$ between the signal on the track 16 and the signal recorded on the track 17 which is the signal on the track 16 multiplied by the coefficient $W(o)$, where v is the velocity of the tape.

Next, the second scanning begins with the initial point of the tape. Even if the beginning point of the signal recorded on the track 17 comes upon the reproducing head 7 of the second channel, the signal on the first track does not appear at the reproducing head 4 at that time due to the time difference $\Delta t$, but appears after $\Delta t$ therefrom. The signal reproduced by the reproducing head or pick-up head 7 of the second channel is amplified by a reproduction amplifier or play-back amplifier 2 and fed through a line 22, a switch 3 and a line 21 to the adder 12 where it is added to the signal on the first track read out by the head 4, amplified by the amplifier 1, and multiplied by the second set weight $W(\Delta t)$ by the coefficient multiplier and phase inverter 11. The signal from the coefficient multiplier 11 corresponds to the signal 2 of (III) in FIG. 1. Therefore, the output of the adder 12 is the sum of the above mentioned two signals, i.e., the signals 1 and 2 of (III) in FIG. 1. This sum is fed to the head 9 through the recording amplifier 13 and recorded again on the tape immediately after the erasure of the previously recorded signal by the erasing head 8. In this manner the sum of the signals shown at (III) in FIG. 1 is successively recorded on the second track. It is necessary to put the erasing head 8 always in the operating state during the scanning.

By the above-mentioned operation the first signal on the first track multiplied by a coefficient at each scanning is accumulated on the second track with successive delay of $\Delta t$. In the example of FIG. 1 for example, the signal (IV) after $n+1$ scans is stored on the second track. After the entire scanning has been completed, the switch 3 is changed over, the accumulated signal on the second track 17 is read out by the reproducing head 7, supplied, passing through the reproduction amplifier 2, the line 22, and the switch 3, to a filter and sensitivity adjuster 14 where it is normalized, and finally recorded on the recorder 15.

Although the above description has been made about a simple case with reference to FIG. 1, Equation (3) can be carried out in all the same order of operations whatever signals the signals (I) and (II) in FIG. 1 may be.

One of the features of the present invention is that when the convolution between the impulse response $W(t)$ and the input $I(t)$ is calculated, the impulse response $W(t)$ can be fixed to an optimal function in relation to the waveform of the input $I(t)$. Another feature of the present invention is that the heads of the tape recorder or the length of the tape between the heads can be fixed. This is based on the fact that the width between L and U is constant.

In the above embodiment, the calculation has been explained by employing a two channel tape recorder. However, if a marketed four channel tape recorder is utilized, the remaining two channels can simultaneously be used for the reproduction and recording of timing pulses.

As is described above, in the calculation of the weighted moving average one of the two input functions is a weight function, and the other is the signal to be dealt with. The present invention includes calculating means for varying the signal value m to be dealt with from $\infty$ to $-\infty$ for each of the n values of the weight function. Since generally $n \ll m$, the number of scans is less than the conventional method.

Since the signal is read at *n* points of $W(t)$ divided with equal time intervals $\Delta t$ and another signal $I(m\Delta t - n\Delta t)$ is multiplied by a coefficient $W(n\Delta t)$, the apparatus of the present invention can perform the calculation merely with a coefficient multiplier. Further, the apparatus of the invention employs an analog adder and subtractor circuit and an accumulating part of successively scanned results instead of an integrator and is simplified by efficiently utilizing the same tape recorder as the accumulating part.

Generally in the analog operation the drift of an apparatus exerts a grave influence on the accuracy of operation, and hence the uniformity of tape feed is an important problem when a tape recorder is utilized as a storing part. However, since the present invention employs a data accumulation method based on multiple scanning, the read out of the input $I(t)$ at each scanning and the synchronization of the time difference $\Delta t$ can perfectly be performed. As stated above the apparatus of the present invention is comprised of the combination of an analog data tape recorder as a storage part and an analog operation circuit with an operation accuracy of about 5 percent, and can provide a small sized and inexpensive computer.

Figure 2:
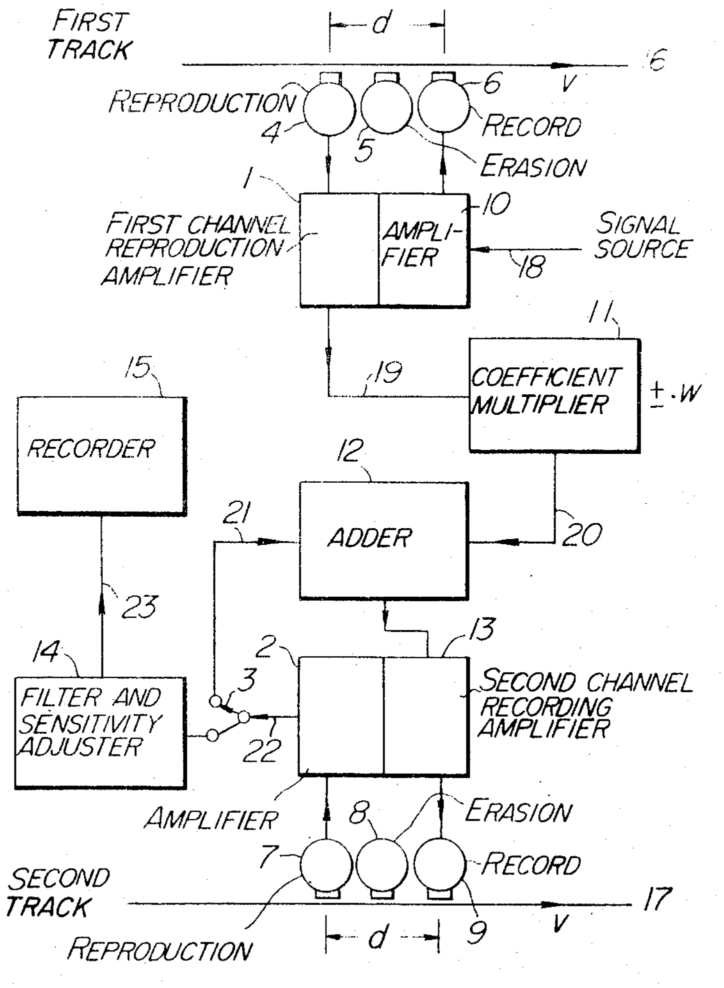
FIG. 2 is a two-channel analog tape recorder to which the present invention is applied.
Figure 3:
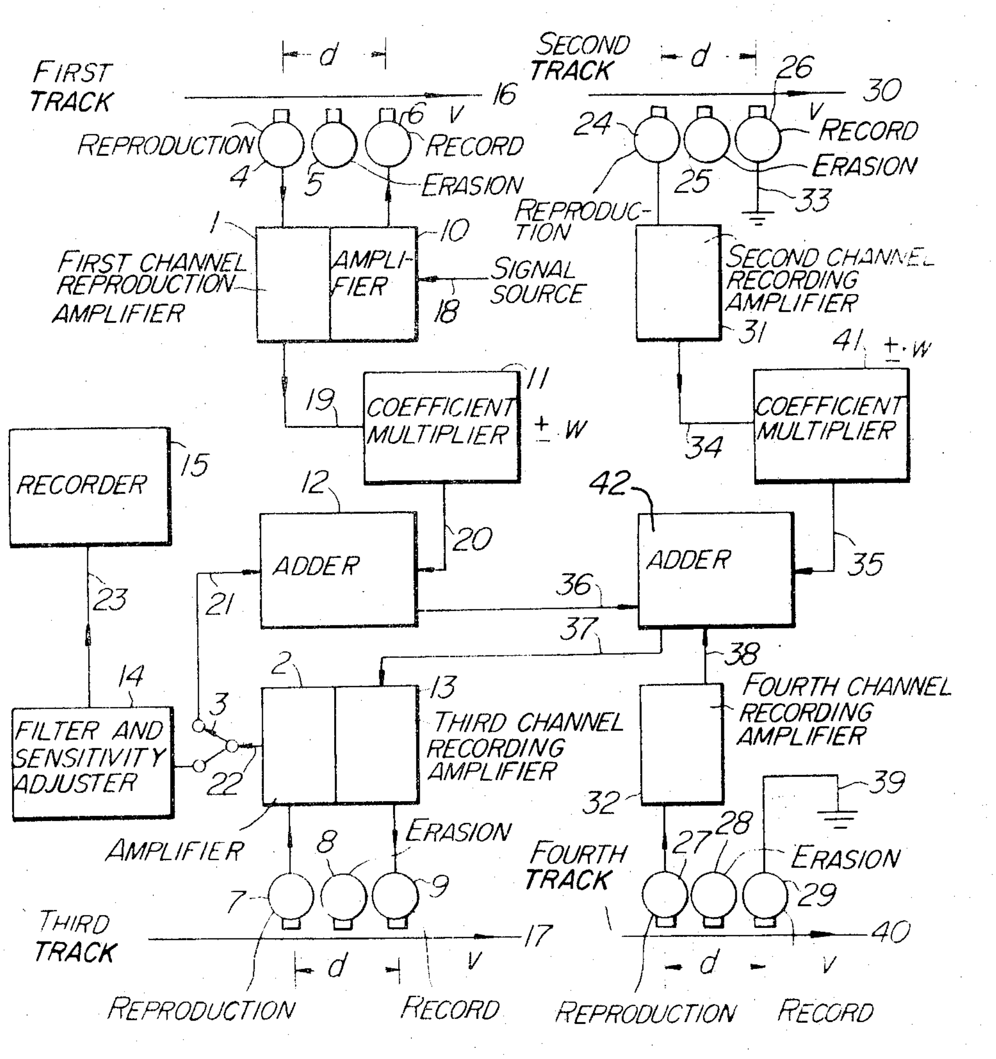
FIG. 3 is a four-channel analog tape recorder to which the present invention is applied.

FIG. 3 shows an analog data recorder capable of compensating the noise and drift produced by unevenness of the speed of tape feed, the variation in the temperature of the main part of the tape recorder, etc. The arrangement of FIG. 3 is different from that of FIG. 2 in that the amplifier, track, etc. for the second channel are used for a third channel. For channel use, the coefficient multiplier may employ Philbrick/Nexus SP-656 Type amplifiers. The tape recorder of FIG. 3 has the third channel and a fourth channel. The reproducing, erasing, and recording heads of the second channel 30 are designated by reference numerals 24, 25, and 26, respectively, and those of the fourth channel 40 are designated by reference numerals 27, 28 and 29, respectively. The recording head 26 of the second channel is grounded as indicated by reference numeral 33 only when a data from the data source 18 is stored on the first track 16. The recording head 29 of the fourth channel is grounded as indicated by reference numeral 39. The erasing head 25 of the second channel is maintained in the non-operating state during the measurement. If noise and drift are generated accompanying the unevenness of the tape feed, the variation in the temperature of the main part of the recorder, etc., when an input signal to be dealt with from the signal source 18 is stored on the first channel track, the drift component is stored on the second channel synchronized with the recording on the first channel. Therefore, it is necessary to remove this drift component. Synchronized with the initiation of reading out by the reproducing head of the first channel the drift component is read out by the reproducing head of the second channel, and, after having passed through a second channel recording amplifier 31 having the same characteristic as the first channel recording amplifier, a line 34, a coefficient multiplier 41 for generating the same weight function as the coefficient multiplier 11, the signal relating to the drift is inverted in its sign by an inverter included in an adder 42 and subtracted from a signal come into the adder 42 from the adder 12 through a path 36. Also the noise and drift accompanying the unevenness of the tape feed, the variation in the temperature of the main part of the recorder, etc. at the time of recording in the third channel track are recorded in the track of the fourth channel similarly to the case of the second channel and synchronized with the initiation of reproduction of the signal in the third channel the drift component is read out and after having passed through an amplifier 32 having the same characteristic as the amplifier 2, and a path 38, the signal relating to the drift is inverted in its sign by the inverter included in the adder 42 as in the case of the second channel, and subtracted from the signal come in the adder 42 through the path 36. The signal removed therefrom the drift component is supplied from the adder 42 through a path 37 to the third channel recording amplifier 13. The amplifiers 31 and 32 can of course be eliminated. Since the operations of the first and third channels are similar to those of the arrangement of FIG. 2, the description thereof is omitted.

According to the invention, the accuracy of calculation of the moving average of a signal including noise therein is greatly improved since the drift component due to the main part of the recorder can completely be compensated.

What is claimed is:

1. An analog computer apparatus comprising:

first means for supplying a first analog data signal;

second means, responsive to said first means, for successively generating a plurality of second analog data signals identical to said first analog data signal but being successively delayed with respect to each other and said first analog data signal by successive predetermined periods of time, said second means comprising a first track of an analog storage tape recorder, a first record head coupled to said first means for supplying said first analog data signal to said first track, a reproduction head spaced apart by a predetermined distance from said record head, so that when said first track is moved in the direction from said reproduction head toward said record head, after said first analog data signal has been stored on said first track, said reproduction head will produce said first signal delayed with respect to the reproduction of said first signal during a previous pass of said track;

third means, responsive to said second means, and being coupled to said reproduction head, for multiplying each of said successively generated second analog data signals by predetermined weighting coefficients, each multiplication corresponding to an individual pass of said tape past said reproduction head, to produce third analog signals; and fourth means, responsive to said third means, for generating an analog output signal representative of the convolution of said first analog data signal with a signal representative of said weighting coefficients, including an adder circuit, having a first input connected to the output of said third means, a second storage tape track coupled to the output of said adder circuit through a record head, whereby the output of said adder circuit will be recorded on said second track, a reproduction head spaced apart from said record head a predetermined distance, so that when said second track passes by said reproduction head in the direction of said record head, the signal on said second track will be detected by said reproduction head and an output will be produced therefrom, and means for coupling the output of said reproduction head to a second input of said adder circuit, whereby the signal stored on said second tape track will be successively added with the output of said coefficient multiplier, and further including means for coupling the output of said reproduction head associated with said second track to an output terminal whereby said analog output signal representative of said convolution will be reproduced.

2. An apparatus according to claim 1, further including a filter and a sensitivity adjusting circuit switchably connected to the reproduction head of said second tape track.

3. An apparatus according to claim 2, further including means for substantially eliminating the effects of recorder noise from said convolution signal including a third and fourth tape recorder channel corresponding to a third and a fourth tape recorder track, respectively connected in series with each of the first and second channels corresponding to said first and second tape tracks, for recording only the noise stored on the tape storage tracks.

4. An apparatus according to claim 3, further including a second adder circuit connected between said adder circuit of said fourth means and said third and fourth channels for combining the signals produced therein at a first pair of inputs thereof and for inversely adding thereto the output of said adder circuit of said fourth means, whereby said noise signals will be cancelled from said convolution signal.

5. An apparatus according to claim 4, wherein said third channel further includes an additional coefficient multiplying means for successively weighting the signals produced by said third channel to be delivered to said second adder circuit.

* * * * *